United States Patent [19]
Sunderland

[11] 3,840,890
[45] Oct. 8, 1974

[54] APPARATUS FOR RECORDING AND REPRODUCING ANALOG DATA

[75] Inventor: John C. Sunderland, New York, N.Y.

[73] Assignee: Capintec, Inc., Mount Vernon, N.Y.

[22] Filed: May 30, 1972

[21] Appl. No.: 257,699

[52] U.S. Cl. .................... 360/32, 325/143, 360/26, 360/29
[51] Int. Cl. .................... G11b 5/02
[58] Field of Search .......... 179/100.2 R, 100.2 MD; 178/6.6 A; 325/143; 332/9 R, 9 T

[56] References Cited

UNITED STATES PATENTS

| | | | |
|---|---|---|---|
| 2,619,632 | 11/1952 | Krumhansl | 325/143 |
| 2,950,352 | 8/1960 | Bleck | 179/100.2 R |
| 3,202,769 | 8/1965 | Coleman, Jr. | 178/6.6 A |
| 3,246,260 | 4/1966 | Clayton | 325/143 |
| 3,413,555 | 11/1966 | Downey | 325/143 |
| 3,418,433 | 12/1968 | Hodge | 179/100.2 R |
| 3,424,861 | 1/1969 | Delvaux | 178/6.6 A |

*Primary Examiner*—Alfred H. Eddleman
*Attorney, Agent, or Firm*—Fleit, Gripple & Jacobson

[57] ABSTRACT

Apparatus for recording and reproducing analog data, the apparatus having means for generating a modified ramp waveform and means in circuit for comparing an input signal representing the analog data with the modified ramp waveform and for producing an output signal to be recorded wherein the output signal has characteristics representative of the analog data. Apparatus for reproducing the analog data receives a signal from a recording device and includes pulse discriminator means for receiving an amplified signal from the recording device, a bistable circuit in operative relationship with the discriminator means and filtering means for filtering a carrier waveform from the output of the bistable circuit and for providing a signal that accurately reproduces the analog data originally received.

5 Claims, 13 Drawing Figures

PATENTED OCT 8 1974 3,840,890

SHEET 4 OF 4

APPARATUS FOR RECORDING AND REPRODUCING ANALOG DATA

This invention relates to analog data apparatus and more particularly to apparatus for recording and accurately reproducing analog data.

In the past, the recording of analog data for process control, motor and magnet controls, biomedical, industrial and environmental monitors has been accomplished with chart recorders yielding a paper or film record or by electronic devices, such as frequency modulated tape recorders. Although these devices have served the purpose, they have not proved entirely satisfactory under all conditions of service. For example, chart recorders are characterized by a bandwidth of only several cycles and the accuracy of chart recorders is only on the order of one percent. The basic instrument is generally inexpensive, but improvements in bandwidth and accuracy add very rapidly to price, complexity, weight, and size of the chart recorder.

The frequency modulated tape recorders previously used provide for a bandwidth of several hundred to several thousand cycles and are characterized by an accuracy on the order of one percent. Although the bandwidth of such tape recorders is a significant improvement over chart recorders, the basic frequency modulated tape recorder is expensive, complex, and cumbersome. In addition, most such recorders are inherently sensitive to tape speed vairations, and there also exists the inconvenience of reel-to-reel tape handling.

It is, therefore, an object of the present invention to provide an inexpensive electronic apparatus for recording and reproducing analog data.

Another object is to provide such a device which optimizes the trade of bandwidth for accuracy.

A further object of the invention is the provision of apparatus for recording and reproducing analog data that provides for a bandwidth of D.C. to 100 Hz with an accuracy on the order of 0.1%.

Still another object is to provide such apparatus which provides for the convenience and economy of standard four-track magnetic cassettes and tape decks.

Yet another object of the present invention is the provision of such apparatus which is inherently free from the effects of tape speed fluctuations.

A still further object is to provide such apparatus that is compatible with existing commercially available and consumer oriented cassette recorders.

Additional objects and advantages of the invention will be set forth in part in the description which follows and in part will be obvious from the description, or may be learned by practice of the invention. The objects and advantages are realized and attained by means of the instrumentalities and combinations particularly pointed out in the appended claims.

To achieve these and other objects, the present invention provides apparatus for recording and reproducing analog data that includes means for generating a ramp waveform of predetermined characteristics, means in circuit with the ramp generating means for modifying the ramp waveform in a predetermined manner, and means in circuit with the modifying means for comparing an input signal representing the analog data with the modified ramp waveform and for producing an output signal to be recorded, the output signal having characteristics representative of the analog data.

As here embodied, the ramp waveform generating means may conveniently include means for generating an electrical current of predetermined characteristics and of positive and negative polarities, operational integrator means in circuit for receiving the electrical current and for producing a linear ramp voltage, and a bistable comparator means in circuit relationship with the generating means and with the operational integrator means for alternately producing signals of opposite polarities to result in the production by the generating means of currents of opposite polarities.

The positive current produced by the generating means is preferably substantially 10 times greater in magnitude than the negative current of the generating means whereby the linear ramp voltage of the operational integrator means is characterized by a negative linear ramp having a slope substantially 10 times the slope of a positive slope linear ramp of the linear ramp voltage.

In accordance with this invention, the ramp waveform modifying means may conveniently include first comparator means in circuit with the ramp generating means for providing an output voltage of a first polarity until the ramp waveform reaches substantially two-thirds of its maximum positive excursion and for providing an output voltage of a second polarity when the ramp waveform reaches substantially two-thirds of its maximum positive excursion, second comparator means in circuit with the ramp generating means and with the first comparator means for providing an output voltage of the second polarity until the ramp waveform reaches substantially two-thirds of its maximum positive excursion and for providing an output voltage of the first polarity when the ramp waveform reaches substantially two-thirds of its maximum positive excursion, and means in circuit with the first and second comparator means for combining the output voltage thereof to provide the modified ramp waveform having a substantially linear ramp portion bounded by first and second substantially constant voltage portions.

As here embodied, the invention also conveniently includes means in circuit with the comparator means for limiting the input signal in a predetermined manner and wherein the comparing means produces the output signal by producing a signal of first polarity when the linear ramp portion of the modified ramp waveform exceeds the voltage of the limited input signal and by producing a signal of second polarity when the modified ramp waveform reaches the first substantially constant voltage portion.

The apparatus of this invention also conveniently includes means adapted to be placed in circuit with a recording device for receiving and amplifying a signal from the recording device, pulse discriminator means in circuit with the amplifier means for detecting pulses from the amplifier means, a bistable circuit in operative relationship with the discriminator means, and means in circuit relationship with the bistable circuit for filtering a carrier waveform from the output of the bistable circuit.

This invention, thus, provides apparatus for efficiently and inexpensively recording and reproducing analog data.

It is to be understood that both the foregoing general description and the following detailed description are exemplary and explanatory and are not restrictive of the invention.

The accompanying drawings, which are incorporated in and constitute a part of this specification, illustrate an example of a preferred embodiment of the invention and, together with the description, serve to explain the principles of the invention.

The apparatus comprising this invention includes two basic subsystems, i.e., a modulator circuit to convert the analog data to a recordable signal that is fed into a recorder device, and a demodulator circuit for withdrawing the recorded information from the recorder device and for accurately reproducing the analog data.

The modulator circuit of this invention converts an input analog signal into a train of alternating positive and negative pulses of fixed frequency but of adjustable relative spacing between adjacent positive and negative pulses. This spacing is made to be linear with respect to the signal input voltage. The pulses are conveyed via a shielded cable to the recording input of a cassette tape recorder, for example. However, it should be understood that other types of recording devices may be used, such as a video recorder, etc. For ease of understanding, however, the invention will be described with respect to a magnetic tape cassette recorder.

The cassette tape recorder records the pulses produced by the modulator circuit onto a tape cassette and also plays the pulses back into the demodulator circuit of the invention when desired. A conventional consumer oriented four-track audio tape recorder, for example, may be used in conjunction with this invention. The circuit principles of the invention are, however, in no way restricted to use with such machines or with tape cassettes. The principles of the invention are applicable to recording analog data of wide bandwidth on other recorders, such as video tape recorders, and the principles of the invention are applicable to the transmission of analog data via telephone lines, coaxial cable, radio transmission apparatus, microwave links, and optical links.

The demodulator subsystem of the invention converts the train of alternating positive and negative pulses played back from the tape recorder into a voltage exactly duplicating the signal input to the modulator subsystem. The spacing relationship between alternating positive and negative pulses is used to control the relative dwell time of a bistable circuit, which switches between accurately controlled positive and negative reference voltage levels. This signal, after appropriate filtering to remove the carrier signal, is the desired replica of the analog input signal. Furthermore, the use of a fixed frequency clock and the incorporation of a highly accurate time reference recorded along with the data signal on the tape permits accurate timing of all signals, and the relative pulse spacing modulation scheme cancels all effects of tape speed fluctuations of duration longer than a pulse spacing.

Figure 1:
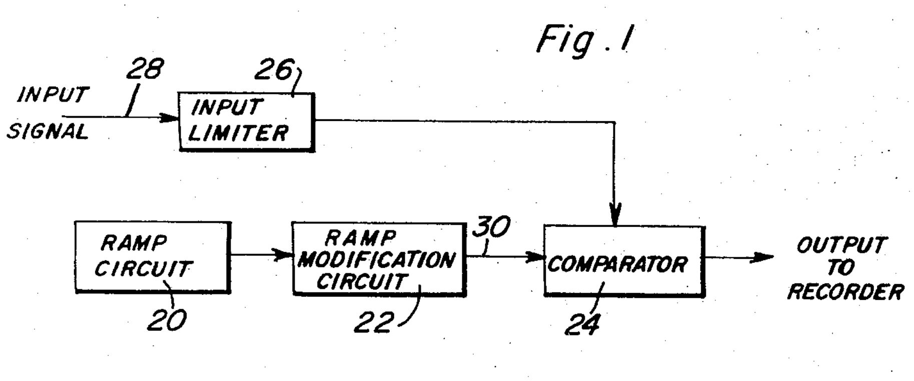
FIG. 1 is a block diagram view illustrating the analog data recording elements of this invention.

With reference now to the drawings, wherein like reference characters designate like or corresponding parts throughout the several views, there is shown in FIG. 1 the modulator circuit or subsystem of this invention which includes ramp circuit 20, ramp modification circuit 22, comparator 24 and input limiter 26 for limiting the amplitude of the analog input signal prior to its entry into comparator 24.

The function of the modulator subsystem of the invention is to convert the analog input signal into a train of alternating positive and negative pulses of fixed frequency but having adjustable relative spacings between adjacent positive and negative pulses. This spacing is made to be linear with respect to the analog signal input voltage, and this mode of operation of the invention is illustrated in simplified form in FIGS. 2 and 3.

Comparator 24 compares the analog signal input from terminal 28 with a linear ramp introduced to the comparator via line 30. When the ramp voltage exceeds that of the input signal, comparator 24 switches its output from negative to positive so as to produce a positive spike output from the differentiator formed by capacitor $C_O$ and resistor $R_O$. When the ramp voltage returns rapidly to its starting value, the output from caparator 24 switches from positive to negative so as to produce a negative spike from the differentiator. The desired linear time relationship will be produced if the ramp is linear and if the comparator switching voltage is insensitive to common mode inputs.

Figure 2:
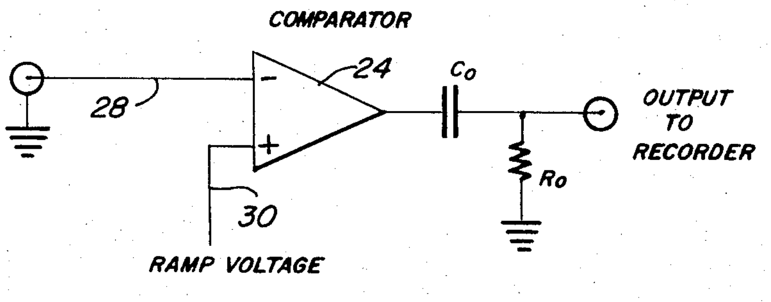
FIG. 2 is a simplified schematic diagram illustrating the concept of the invention.
Figure 4:
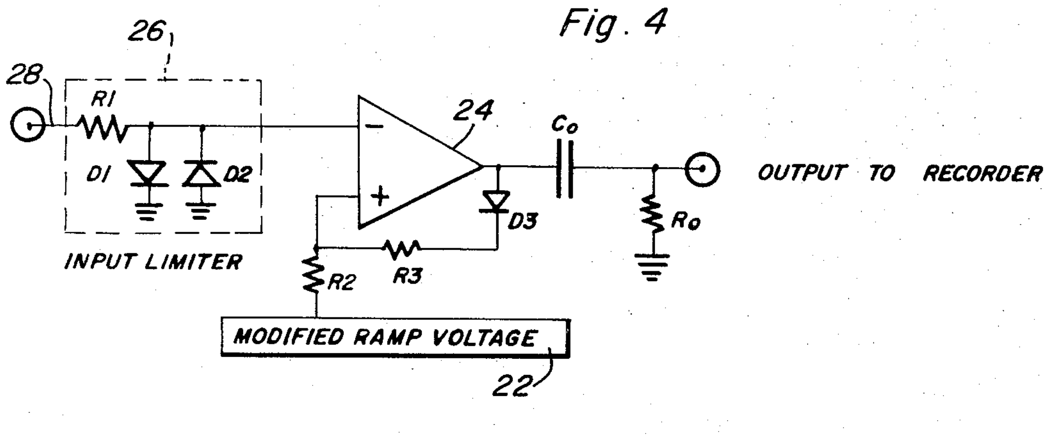
FIG. 4 is a simplified schematic diagram of the recording portion of the invention.
Figure 3:
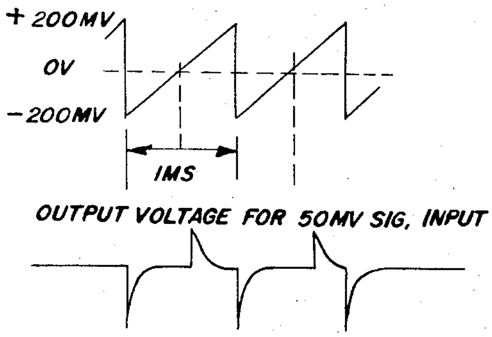
FIG. 3 is a graphical illustration of the signals produced by the circuit illustrated in FIG. 2.

The simplified circuit of FIG. 2 is preferably modified, as in FIG. 4, to guarantee that the comparator operates once and only once per ramp voltage cycle. An input limitor 26, comprised of current limiting resistor R1 and voltage limiting diodes D1 and D2, limits the input voltage to comparator 24 to less than about one volt, for example, without affecting the linear transmission of signals of up to 100 millivolts.

The ramp voltage is modified by means of the addition of negative and positive extensions of the ramp (FIG. 5) to ensure that the comparator will switch between 0.2 and 0.8 milliseconds, for example, after the ramp cycle begins and regardless of the magnitude of the input signal voltage.

A feedback network comprised of resistors R2 and R3 and of diode D3 ensures that comparator 24 can fire only once per ramp cycle regardless of the number of times the analog signal input crosses and recrosses the voltage of the linear ramp. The feedback network leaves the ramp voltage unaffected until the input signal voltage exceeds it. When the comparator achieves its positive output voltage state, the feedback network impresses an additional one volt signal, for example, upon the ramp to ensure that the signal input can no longer affect the state of comparator 24.

Figure 6:
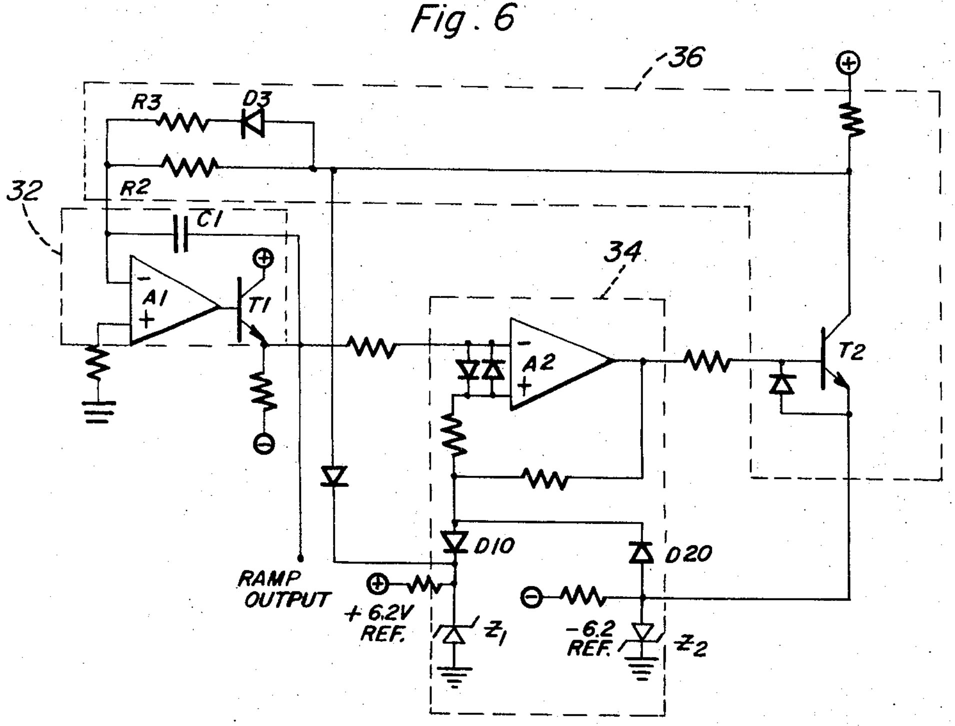
FIG. 6 is a schematic illustration of the means for generating a ramp waveform of this invention.

Ramp circuit 20 may conveniently produce a sawtooth waveform with a repetition rate of 1.0KHz. The ramp circuit is illustrated in FIG. 6 and is preferably comprised of an operational integrator 32, including amplifier A1, transistor T1 and capacitor C1. Ramp circuit 20 also includes a high and low limit bistable comparator 34 comprised of amplifier A2, diodes D10, D20, and Zener diodes Z1 and Z2. The ramp circuit also includes a switchable bipolar current generator 36 comprised of transistor T2, resistors R2 and R3, diode D3 and associated components.

The operation of ramp generator 20, as illustrated in FIG. 6, may be best explained by initially considering that comparator 34 is in its negative output state. Current generator 36 then delivers a negative current, as determined by the negative reference voltage produced by Zener diode Z2 and resistor R2, to operational integrator 32, and this results in a linear ramp produced at the emitter of transistor T1. When the ramp voltage reaches the positive reference voltage produced by Zener diode Z1, comparator 34 is switched to its positive output state so as to reverse the polarity of current generator 36.

The positive current produced by the current generator is determined by the positive reference voltage produced by Zener diode Z1 and resistor R3. This positive current is made to be about a factor of 10 larger than the negative current, resulting in a negative slope linear ramp about a factor of ten faster than the positive slope linear ramp. When the ramp voltage reaches that of the positive reference determined by the Zener diode Z1, comparator 34 switches to its negative output state to repeat the cycle.

Figure 7:
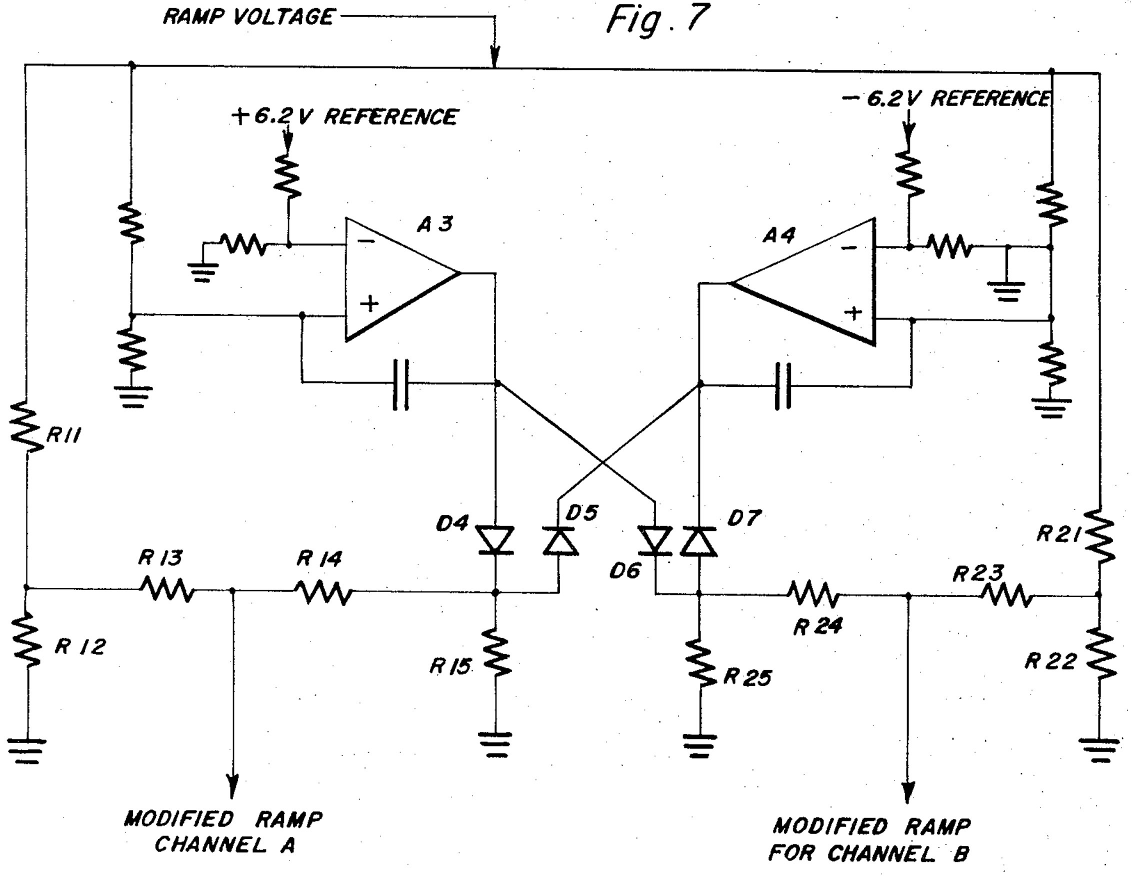
FIG. 7 is a schematic illustration of the means for modifying the ramp waveform of this invention.

Ramp modification circuit 22 is best illustrated in FIG. 7, and this circuit is comprised essentially of comparators A3 and A4 and associated components. Comparator A3 remains in its negative output voltage state until the ramp voltage from circuit 20 achieves approximately two-thirds of its maximum positive excursion, and then comparator A3 switches to its positive output voltage state. Comparator A4 functions identically except that it switches from a negative to a positive output state when the voltage from ramp circuit 20 goes more positive than two-thirds of its maximum negative voltage.

Figure 5:
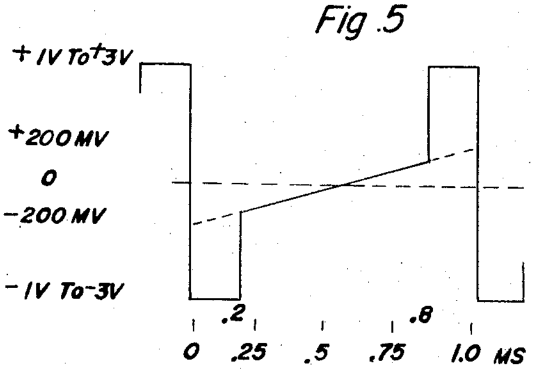
FIG. 5 is a graphical illustration of the modified ramp waveform produced by the invention.

The outputs of comparators A3 and A4 are combined over diodes D4, D5, D6, D7 and over resistors R11–R15 and R21–R25 along with the ramp voltage to yield the modified ramp voltages for channels A and B of the apparatus, as illustrated in FIG. 5. It should be understood, of course, that the invention is not limited to the specific times and voltage levels illustrated in FIG. 5 and that other voltage and time parameters, as desired, are contemplated for the modified ramp voltage in accordance with the invention.

Figure 8:
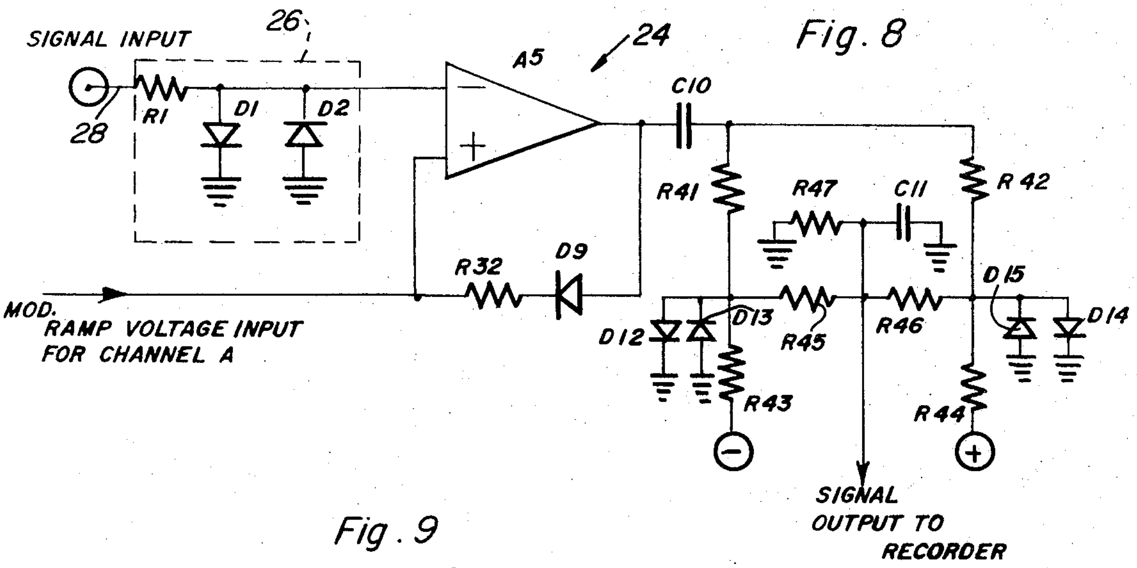
FIG. 8 is a schematic illustration of a comparing means in accordance with this invention for comparing an input signal representing the analog data with the modified ramp waveform and for producing an output signal to be recorded, the output signal having characteristics representative of the analog data.

Comparator circuit 24 is best illustrated in FIG. 8, and this circuit operates to compare the modified ramp voltage with the analog signal input voltage and prepares the resultant signal for optimal recording onto the magnetic tape or other recording medium.

The analog signal input is first limited by input limitor 26 to less than about one volt, for example. The signal voltage over the full scale range of +100 millivolts to −100 millivolts is unaffected by input limitor 26.

The operation of comparator 24 is best described sequentially by beginning from the initiation of the modified ramp voltage (FIG. 5). This voltage may, as an example, begin within the range of about −1 volt to −3 volts in order to guarantee that the output of amplifier A5 is in the negative voltage state. Furthermore, comparator 24 cannot switch until the modified ramp enters the linear ramp portion of its cycle.

When the ramp voltage from ramp circuit 20 becomes more positive than the limited analog input voltage, the output of amplifier A5 switches to the positive voltage state. The positive voltage excursion of the modified ramp voltage to +3 volts, for example, ensures that this occurs before the end of the cycle. The positive output voltage state is locked in by diode D9 and resistor R32 until the modified ramp returns to −3 volts. The output of amplifier A5 is differentiated and limited by capacitor C10, resistors R41–R44 and by diodes D12–D15 to produce separate positive and negative rectangular pulses corresponding to positive and negative output transitions of amplifier A5.

These pulses are then combined and smoothed by resistors R45–R47 and by capacitor c11 to produce the desired train of alternating positive and negative pulses of fixed frequency but of variable spacing between adjacent positive and negative pulses. This spacing is linear in relationship to the analog signal input voltage, and the waveform produced by comparator 24 may be optimized for a particular tape recorder or other recording device being used.

The output waveform from comparator 24 has no D.C. component, and the positive and negative pulses are of such shape and amplitude as to produce a bipolar pulse on the tape, each bipolar pulse having approximately zero D.C. component.

It should also be understood that the comparator circuit illustrated in FIG. 8 is provided for only one channel of a multi-channel unit and that separate comparator circuits are provided for each individual channel.

Figure 9:
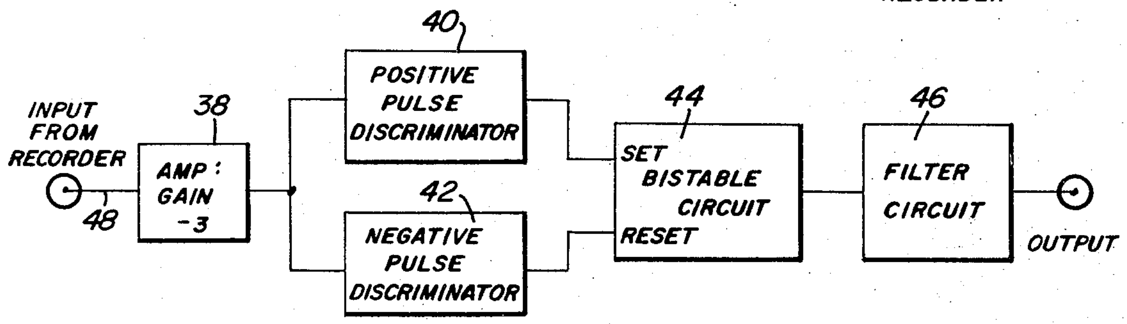
FIG. 9 is a block diagram illustration of the reproducing elements of the invention.

The demodulator circuit or subsystem of this invention is illustrated in block diagram form in FIG. 9, and this illustration is for one channel only. Additional such demodulator circuits are provided for each individual channel.

The demodulator subsystem converts the train of pulses played back from a tape recorder or other recording device into a voltage exactly duplicating the analog signal input voltage to the modulator circuit, illustrated in FIG. 1.

The demodulator subsystem is comprised of an amplifier 38, a positive pulse discriminator 40, a negative pulse discriminator 42, a bistable circuit 44 and a filter circuit 46. Amplifier 38 presents an appropriate impedance to the recorder output on line 48, inverts the pulses, increases their amplitude and removes any D.C. component. The positive and negative pulse discriminators 40, 42 detect the corresponding pulses from the output of amplifier 38 and operate bistable circuit 44. The pulses recovered from the recording unit tape are bipolar, and convention identifies the positive pulse as that pulse having an initial portion that is positive. The output from bistable circuit 44 switches from between stable positive and negative reference supplies and the average voltage appearing at the output of bistable circuit 44 exactly duplicates the analog input voltage on line 28 (FIG. 1) to the modulator subsystem. Furthermore, this relationship holds independently of the ramp circuit repetition rate and independently of the tape speed. This is also true even for variations in ramp circuit repetition rate and during variations in tape speed that are slow compared to the ramp circuit repetition rate.

A ramp circuit repetition rate of 1.0KHz is sufficiently fast to remove all significant effects of variations in ramp circuit repetition rate and tape speed even in cases of fairly crude electrical and mechanical design. All that remains to be done to the signal emanating from bistable circuit 44 is to filter out the carrier signal, and filter circuit 46 employs a six-section active R-C filter that realizes a bandwidth of D.C. to 100 Hz with carrier suppression of approximately $10^4$. The full bandwidth of the signal on the tape is about 300 Hz as determined by sampling theory. However, the filtering techniques required to realize this bandwidth are not considered to be worth the additional cost. It is to be understood, however, that increasing the bandwidth to this value is contemplated by this invention.

The bandwidth can also be increased by increasing the repetition rate of ramp circuit 20. For the standard 1⅞ ips tape speed and conventional recording electronics, sacrifices in linearity or increased complexity in the pulse detection circuitry are required for repetition rates above about ! to 2 KHz. The bandwith can be most easily improved by increasing tape speed and correspondingly increasing ramp repetition rate. Correspondingly, a longer recording time may be achieved by reducing the tape speed and by making a corresponding reduction in ramp repetition rate. Changes in basic speeds must be followed throughout all timing circuits, including the filter network.

Figure 10:
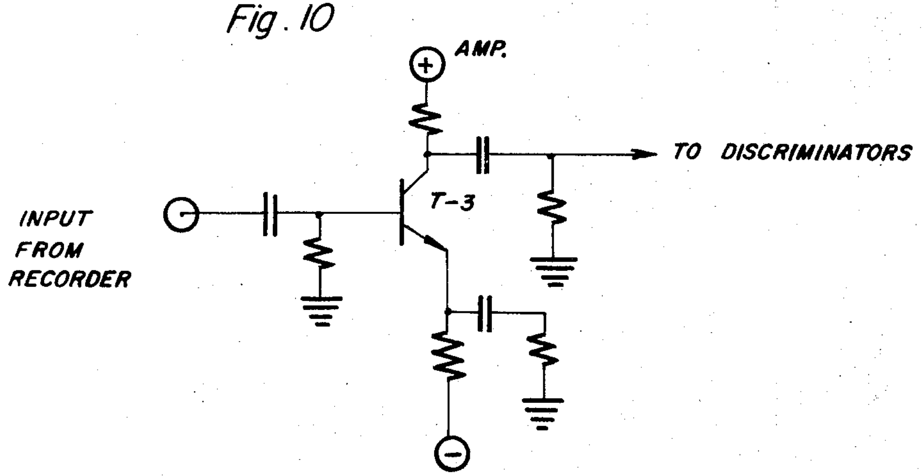
FIG. 10 is a schematic diagram showing the amplifying means of the reproducing apparatus.

Amplifier 38 is illustrated in more detail in FIG. 10, and the amplifier consists of a single transistor T3 operated as an inverting amplifier with degeneration in the emitter to achieve a stable gain of about −3 with a decay time of about 25 milliseconds and an input impedance of about 15K. Of course, these specific parameters are again exemplary only and do not in any way limit applicant's invention with respect to other amplifier embodiments or to other parameters. The waveform distortions incurred by amplifier 38 are negligible for a 0.1 percent accuracy device.

Figure 11:
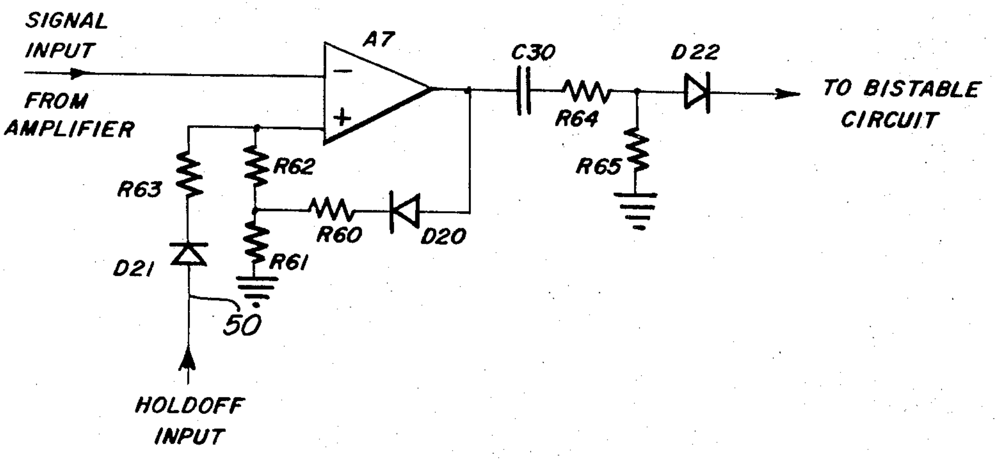
FIG. 11 is a schematic diagram of the pulse discriminator means of the invention.

A pulse discriminator, such as discriminators 40 and 42, is illustrated in more detail in FIG. 11. These discriminators must trigger a very precise time with respect to the bipolar input pulse. Furthermore, each discriminator must be protected from firing on the second portion of the pulse of opposite polarity.

The circuit utilized as a preferred embodiment and not in any way limiting the invention, is a zero-crossing discriminator which is armed by the first part of the pulse passing a threshold level of the appropriate polarity and which is protected from firing on a second part of the pulse of opposite polarity by a hold-off signal derived by the output 50 of bistable circuit 44.

The basic circuit illustrated in FIG. 11 is for positive pulses. With no signal input, the output of the discriminator is in the positive voltage state, placing a bias voltage of about ¼ volt on the non-inverting input of amplifier A7. When the input becomes more positive than this bias voltage, the output of amplifier A7 switches to the negative voltage state, placing a zero bias voltage on the non-inverting input of A7. When the input voltage crosses zero, the output of the discriminator returns to its positive state. The output of amplifier A7 is differentiated and attenuated by capacitor C30 and by resistors R64 and R65 to form a pulse suitable for switching bistable circuit 44.

Diode D22 (FIG. 11) selects the positive pulse associated with the zero crossing and does not pass the negative pulse. The hold-off input 50 is raised to a positive voltage of sufficient amplitude and duration to place upon the non-inverting input of amplifier A7 a voltage which exceeds that of the second part of the negative pulse from amplifier 38 and thereby preventing amplifier A7 from switching. The negative pulse discriminator is identical with the positive discriminator illustrated in FIG. 11 except for reversal of the polarity of diodes D20, D21, and D22.

Figure 12:
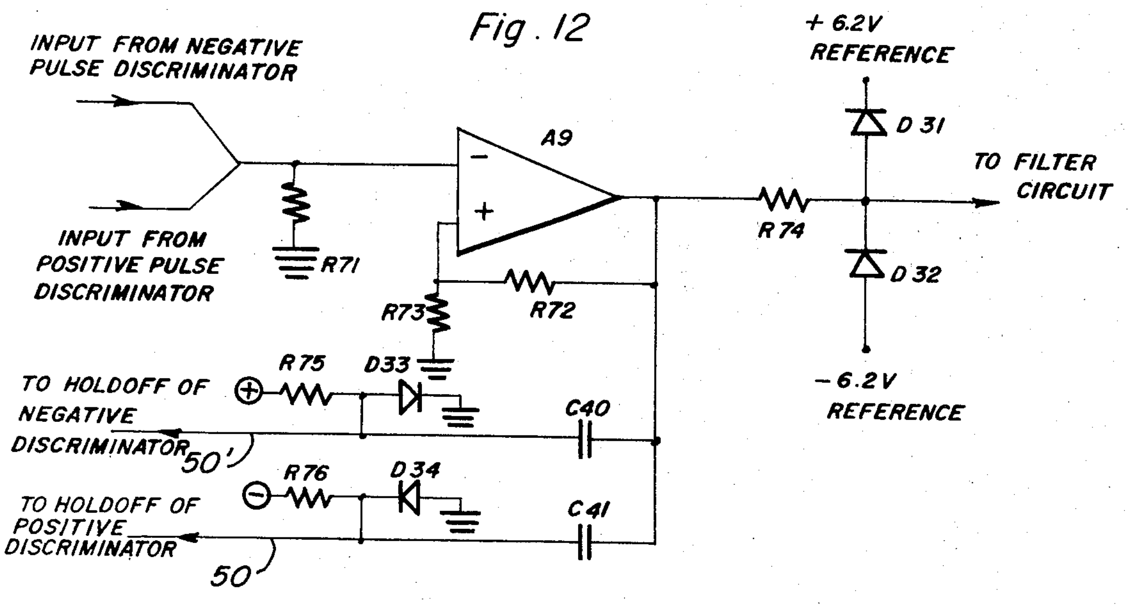
FIG. 12 is a schematic illustration of the bistable circuit of the invention.

The bistable circuit 44 employed is preferably an operational amplifier A9 with positive feedback as illustrated in FIG. 12. The output of amplifier A9 is clamped to the references by resistors R74 and by diodes D31 or D32 for positive and negative output states of amplifier A9, respectively. This precision waveform is passed through filter circuit 46 to remove the carrier waveform. A direct output of amplifier A9 also feeds a pair of differential circuits comprised of capacitor C40, resistor R75 and diode D33 and of capacitor C41, resistor R76 and diode D76. These circuits deliver the necessary hold-off waveforms to the negative and positive discriminators, respectively.

Figure 13:
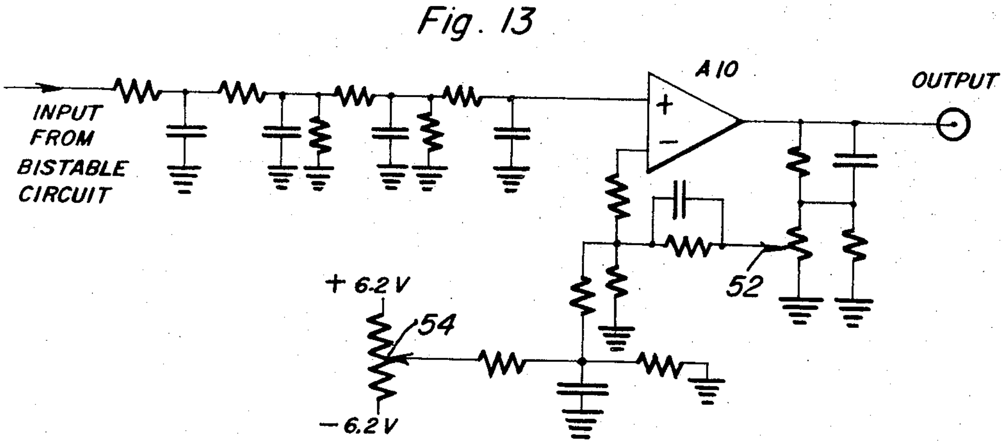
FIG. 13 is a schematic diagram of the filtering circuit of the invention.

The filter circuit 46 utilized in the demodulator subsystem (FIG. 9) is illustrated in more detail in FIG. 13. Filter circuit 46 removes the carrier waveform from the output of bistable circuit 44. Filter circuit 46 consists essentially of a four-section R-C filter, the output of which is amplified by an operational amplifier A10 employing an additional two stages of R-C filtering in its feedback loop.

All R-C sections of filter circuit 46 preferably have a time constant of about 0.6 milliseconds, for example, yielding a bandwidth of about 100 Hz. Gain and zero adjustment potentiometers 52 and 54 are also provided, and a low bias current, high open loop gain operational amplifier A10 is employed to achieve good stability of the zero and of the circuit gain.

This invention thus provides for extremely accurate and economical apparatus for recording and reproducing analog data. The invention in its broader aspects is not limited to the specific details shown and described, and departures may be made from such details without departing from the principles of the invention and without sacrificing its chief advantages.

What is claimed is:

1. Apparatus for recording and reproducing analog data, comprising: input terminals for receiving analog data input signals; limiter means for limiting the voltage level of said input signals; ramp generator means for generating a ramp voltage signal having both positive-going and negative-going portions, the frequency of said ramp voltage signal being in excess of that of said input signals; ramp modification means for receiving the ramp voltage signal from said ramp generator means and for issuing and algebraically impressing on said ramp voltage signal, positive-going and negative-going peaks at locations on said ramp voltage signal where the magnitude is in excess of a predetermined threshold, said peaks being of a magnitude in excess of the limited voltage level of said input signals; comparator means for receiving said analog data input signals after being limited by said limiter means, for receiving said ramp voltage signal after being modified by said ramp modification means, for comparing said limited input sigals with said modified ramp voltage signals, and for issuing a pulse when the magnitude of said limited input signal exceeds the magnitude of said modified ramp voltage signal; and feedback means to ensure that only one pulse is issued by said comparator means for each period of said modified ramp voltage signal.

2. Apparatus as in claim 1, wherein said comparator means is an operational amplifier which changes from a first to a second state when the magnitude of the limited input signal exceeds that of the modified ramp voltage signal.

3. Apparatus as in claim 1, wherein said ramp modification means impresses positive peaks when said ramp voltage signal reaches substantially two-thirds of its maximum positive excursion, and impresses negative peaks when said ramp voltage signal reaches substantially two-thirds of its maximum negative excursion.

4. Apparatus as in claim 1, and further comprising amplifier means for receiving and amplifying the pulses issued by said comparitor means; first discriminator means for detecting positive pulses amplified by said amplifier means and for issuing a signal of a first polarity in response thereto; second discriminator means for detecting negative pulses amplified by said amplifier means, and for issuing a signal of a second and opposite polarity in response thereto; a bistable sensing circuit for receiving the signals issued by said first and said second discriminator means, for changing states when receiving alternating polarity signals from said first and second discriminator means, and for issuing a clamped voltage signal of a first state in response to said first polarity and of a second state in response to said second polarity; and filter means for receiving the clamped voltage signals from said bistable sensing circuit, for smoothing the same, and for filtering all carrier signals out of the same.

5. Apparatus as in claim 4 wherein said discriminators are zero-crossing discriminators that are each armed by a first part of a respective pulse from said amplifier means passing a predetermined threshold level of selected polarity and wherein the discriminators are coupled in circuit to each receive respective hold-off signals from said bistable circuit to protect the discriminators from firing on the second part of a pulse of opposite polarity from said respective pulse.

* * * * *